No. 780,606. PATENTED JAN. 24, 1905.
C. H. FOX.
INSERTIBLE SAW TOOTH.
APPLICATION FILED MAR. 30, 1904.
2 SHEETS—SHEET 1.
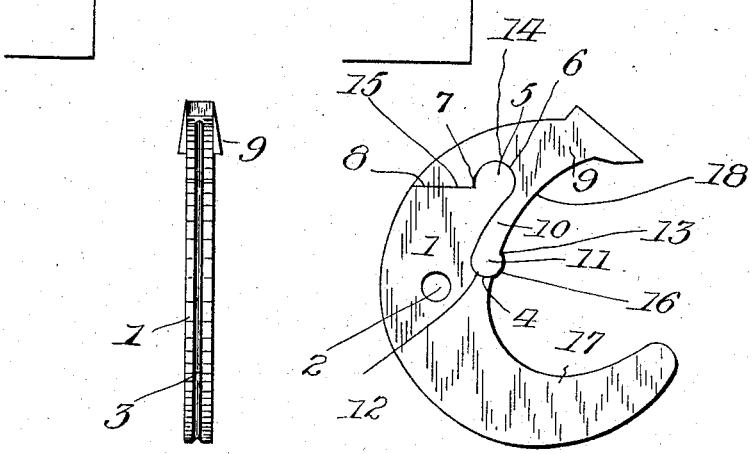

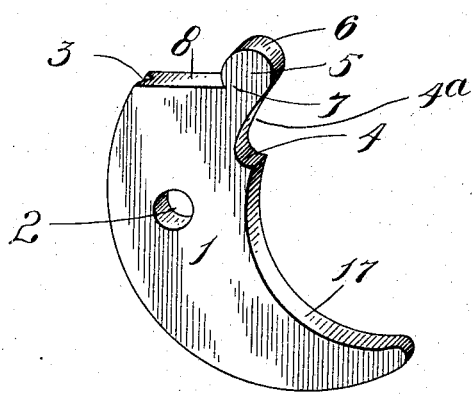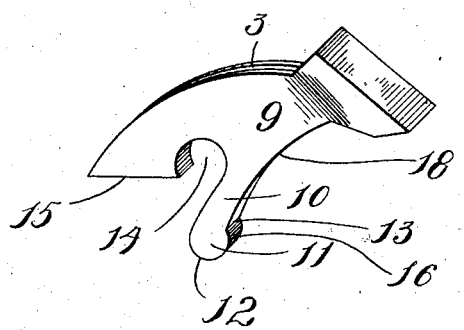

No. 780,606. Patented January 24, 1905.

UNITED STATES PATENT OFFICE.

CHURCHILL HORACE FOX, OF FREDERICTON, CANADA, ASSIGNOR OF TWO-THIRDS TO HENRY G. VENESS, OF FREDERICTON, CANADA, AND LEMUEL E. BROOKS, OF WEYMOUTH, CANADA.

INSERTIBLE SAW-TOOTH.

SPECIFICATION forming part of Letters Patent No. 780,606, dated January 24, 1905.

Application filed March 30, 1904. Serial No. 200,737.

*To all whom it may concern:*

Be it known that I, CHURCHILL HORACE FOX, a subject of the King of Great Britain, residing at the city of Fredericton, county of York, in the Province of New Brunswick, Canada, have invented certain new and useful Improvements in Insertible Saw-Teeth; and I do hereby declare that the following is a full, clear, and exact description of the invention, such as will enable others skilled in the art to which it appertains to make and use the same.

This invention relates to certain new and useful improvements in insertible saw-teeth of that class in which the points only of the teeth are adapted to be renewed when worn.

The present invention has for its objects, among others, to provide a simple and improved form of tooth-point and means for detachably holding it in position in the shank. I aim to effect a saving in the shank of the tooth, which requires to be renewed but once in a great while, while the tooth, the cost of which is but trifling, may be renewed as often as may be required.

A further object is to provide a construction by which every time a new tooth is put in it renews the shank as well as the tooth, so far as the wear is concerned. Usually the wear takes place not only on the point of the tooth, but also at the center, and when the shank gets worn it will not carry the dust, and therefore it becomes worthless and soon has to be discarded. By my improved construction the shank is protected from wear by means of a slight projection on the tooth at the point where the head of the tooth or bit comes in contact with the shank. This is a point substantially at the center of the gullet where the greatest wear comes.

Still another object is to provide for the more secure holding of the insertible tooth in position. To this end the tooth is formed with a head extending in the general direction of its length and having a contracted portion to engage a correspondingly-shaped recess in the shank and a portion extending at substantially right angles to the first-mentioned head and having a recess to receive a head on the shank and provided with a contracted portion, so that the tooth is braced in two directions at substantially right angles to each other and removal thereof is impossible except transversely to the plane of the face of the shank.

Other objects and advantages of the invention will hereinafter appear, and the novel features thereof will be specifically defined by the appended claim.

The invention is clearly illustrated in the accompanying drawings, which, with the numerals of reference marked thereon, form a part of this specification, and in which—

Figure 1 is a face view of my improved tooth and its shank or gullet. Fig. 2 is an edge view thereof. Fig. 3 is a plan view looking down on Fig. 1. Fig. 4 is a perspective view of the shank, the tooth being removed therefrom; and Fig. 5 is a perspective view of the tooth detached from the shank.

Like numerals of reference indicate like parts in the different views.

In the drawings, 1 designates the shank or gullet, adapted to be removably inserted in the usual recess therefor in the saw-blade, but which is not herein illustrated. The blade or body of the saw forms no part of the present invention, which resides solely in the insertible saw-tooth and its shank or gullet. Hence the illustration has been confined to such parts. This shank or gullet is provided with a suitable hole 2 for the reception of a suitable tool (not shown) by which it may be turned to the proper position in its recess in the body of the saw. The inner edge of the shank is provided with the peripheral depression or groove 3 for a purpose well understood. The shank is formed at about the midportion of its curved concave face with a recess 4$^a$, having a curved end portion 4, and at the other end of the wall of said recess with a head 5, which is rounded, as seen at 6, and somewhat contracted, as seen at 7, and formed also with a square shoulder 8, extending from the contracted portion of the head to the outer periphery of the shank, as seen most clearly in Fig. 1.

9 is the tooth. It is formed with an elongated or reinforcing portion 10, terminating in a head 11, with a contact rounded portion 12 and a contracted portion 13, as seen in Fig. 1. It is also provided with the recess 14, corresponding in shape to the head 5 on the shank and with the square shoulder or face 15, matching the square shoulder or face 8 on the shank, as shown clearly in Fig. 1. At the junction of the rounded face 12 of the head 11 with the curved wall of its recess a projecting portion 16 extends beyond the line joining the curves of the recess 17 of the shank and the curved wall 18 of the tooth, as will be clearly understood from Fig. 1. This projection is at a point where it takes the wear from the shank, and thus the life of the latter is materially lengthened. The projection 16 breaks the continuity of the curved walls 17 and 18. The tooth is insertible in its shank by a movement sidewise or at right angles to the strain on the tooth, and the tooth cannot become displaced during the operation of the saw.

The advantages of the construction above outlined will be apparent to those skilled in the art, and will be readily appreciated by those having occasion to use this class of devices.

Modifications in detail may be resorted to without departing from the spirit of the invention or sacrificing any of its advantages.

What is claimed as new is—

An insertible saw-tooth of the character described, comprising a shank having a recess formed thereon; an enlarged rounded portion or head formed upon the said shank and having a contracted inner portion and a shoulder or abutting surface formed upon the said shank adjacent to said contracted portion of said head, and a detachable tooth having a recess and a shoulder or abutting surface formed thereon, and an elongated reinforcing member formed upon the said detachable tooth; the said recess, abutting surface and elongated reinforcing member coöperating with the said enlarged head, abutting surface and recess respectively upon the said shank to hold the tooth thereon, and the said reinforcing member being provided with a thickened lower end which is adapted to project beyond the face or edge of the shank.

In witness whereof I have hereunto set my hand in the presence of two witnesses.

CHURCHILL HORACE FOX.

Witnesses:
NORMAN P. MACLEOD,
W. H. BUTLER.